United States Patent
Mourier et al.

(10) Patent No.: US 6,351,103 B1
(45) Date of Patent: Feb. 26, 2002

(54) PROCESS FOR SUPPLYING ELECTRICAL ENERGY TO THE NETWORK WITH AN AC GENERATOR ASSOCIATED WITH A TURBINE

(75) Inventors: Serge Mourier, Montbonnot; Marc Vezinet, Montgeron, both of (FR)

(73) Assignee: L'Air Liquide, Societe Anonyme pour l'Etude et l'Exploitation des Procedes Georges Claudes, Paris Cedex (FR)

( * ) Notice: Subject to any disclaimer, the term of this patent is extended or adjusted under 35 U.S.C. 154(b) by 18 days.

(21) Appl. No.: 09/629,699

(22) Filed: Jul. 31, 2000

(30) Foreign Application Priority Data

Jan. 26, 2000 (FR) .............................................. 00 00994

(51) Int. Cl.$^7$ ................................................ H02P 9/00
(52) U.S. Cl. ............................... 322/20; 322/15; 290/7; 318/799
(58) Field of Search ............................... 290/7; 322/15, 322/20; 318/799

(56) References Cited

U.S. PATENT DOCUMENTS

| | | | | |
|---|---|---|---|---|
| 4,376,295 A | * | 3/1983 | Uenosono et al. | ............. 361/21 |
| 4,677,364 A | * | 6/1987 | Williams et al. | ............... 322/47 |
| 5,936,370 A | * | 8/1999 | Fukao et al. | ................. 318/652 |
| 6,066,934 A | * | 5/2000 | Kaitani et al. | ............... 318/490 |
| 6,072,302 A | * | 6/2000 | Underwood et al. | .......... 322/17 |
| 6,118,187 A | * | 9/2000 | Hepner et al. | ............ 290/40 B |

* cited by examiner

*Primary Examiner*—Nicholas Ponomarenko
(74) *Attorney, Agent, or Firm*—Young & Thompson

(57) ABSTRACT

Process for supplying electrical energy to the network with an AC generator associated with a turbine, by means of a transformer, characterized in that it consists in evaluating the generator precisely as a function of the needs of the site by lowering its nominal voltage as low as possible while continuing to satisfy the capacity of the generator to send active power delivered by the turbine and the reactive power corresponding to this active power required by a consumer or the network manager.

6 Claims, 3 Drawing Sheets

PROCESS FOR SUPPLYING ELECTRICAL ENERGY TO THE NETWORK WITH AN AC GENERATOR ASSOCIATED WITH A TURBINE

The present invention relates to the conditions for connecting to the network electrical energy production sites and relates more particularly to improving the conditions of connection to the network of high power alternators.

The connection to the network of a generator of the mentioned type is ensured by means of a transformer.

The generator delivers to the network the active power and the reactive power.

The active power Pg supplied by the alternator is given by the relationship:

$$Pg = -Vg \cdot I \cdot \cos \psi_g \quad (1)$$

in which

Vg is the voltage at the terminals of the generator,

I is the current, $\cos \psi_g$ is the power factor of the generator.

The active power Pcp received by the network at the point of delivery is given by the relationship:

$$Pcp = +Vcp \cdot I \cdot \cos \psi_{cp} \quad (2)$$

in which

Vcp is the voltage at the terminals of the network, at the output of the transformer, I is the current, $\psi_{cp}$ is the power factor seen by the network at the point of delivery.

$$Pcp = -Pg \quad (3)$$

It will be noted that given the above:

$$Vg \cdot \cos \psi_g = Vcp \cdot \cos \psi_{cp}$$

It will therefore be seen that the active power received by the network is equal to the active power supplied by the alternator, considering the losses of the transformer to be negligible.

The reactive power Qg of the generator is given by the relationship:

$$Qg = -Vg \cdot I \cdot \sin \psi_g \quad (4)$$

The reactive power of the network is given by the relationship:

$$Qcp = V_{cp} \cdot I \cdot \sin \psi_{cp} \quad (5)$$

$$Qg - XtI^2 = Qcp \quad (6)$$

in which

Xt is the resistance of the transformer.

Thus, the reactive power received by the network is equal to that supplied by the alternator, decreased by the consumption of the transformer of reactive power $XtI^2$.

However, the active power and the reactive power of the network supplied by the generator are constant values that the supplier of electrical energy has to take account of for the construction and the operation of the generator.

A schedule of charge established by the study commission EDF/GS21 defines the conditions of connection of private energy production units to the public transport network.

The principal rule concerning the electrical dimensioning of an installation for energy production is the following:

verification of the maximum short circuit current supplied by the installation at the point of delivery to the network, this verification having the result in most cases of giving rise to an increase of the reactance of the transformer to reduce the short circuit current of the installation, verification of the installation to supply to the delivery point, a certain quantity of reactive power as a function of the conditions (value) of voltage at the delivery point.

This supply constraint is expressed in the document GS21 by a graph on which is shown on the abscissa the reactive power Q exchanged at the point of delivery, expressed in proportion to the maximum active power of the installation and officially called Pmax, and on the ordinate, the voltage at the point of delivery expressed as a value relative to a voltage reference, officially called Vref whose value is given by EDF.

The above verification and the resulting optimizations have naturally contradictory effects.

Observing the initial constraint of short circuit current tends very often to increase the reactance of the transformer connecting the alternator to the network.

The increase of this reactance leads to:

higher reactive power consumption in the transformer, which is undesirable when it is sought to export this reactive power to the network, a greater and greater incapacity when the reactance increases, to:

export the active power when the voltage at the point of delivery is somewhat raised, import reactive power when the voltage at the port of delivery is somewhat low.

The degradation of the performances connected to the reactance of the transformer is to be seen from an examination of two graphs.

The performances [q,u] at the terminals of the alternator which could be called gross, The corresponding net performances [q,u] at the point of delivery.

The graph of gross performances [q,u] at the terminals of an alternator is a rectangle.

By way of example, there can be given:

a variable height of umin=0.9 uN to umax=1.1 Un a width of Qmin=−0.2 Pmax+0.6 Pmax The graph at the beginning of the demonstration in the schedules of charges is based on an alternator whose diagram [q,u] at its terminals is a rectangle.

The graph of net performances [q,u] at the point of delivery becomes a trapezoid.

The initial rectangle containing all the points for which an operation of the generator is guaranteed, is naturally deformed when traversing the reactance of the transformer.

The high and low horizontal limits indicating the maximum or minimum constant voltage of the alternator are inclined and at the secondary of the transformer remain substantially straight.

They represent conditions of voltage and conditions of reactive power existing at the secondary of the transformer for a same condition of operation of the alternator.

In practice, the high and low limits are naturally obtained when the regulator of the alternator is blocked in the respective position of maximum voltage and minimum voltage and the voltage of the network at the point of delivery is varied to obtain the same reactive power absorbed or supplied by the alternator.

There will thus be seen an inability of the "alternator+ transformer" assembly to supply, or to consume, reactive power for the same voltage conditions.

Differences in voltage at the point of delivery are required which are much greater, to exchange the same quantities of reactive power.

The greater the reactance of the transformer, the greater the differences must be.

Increase of the reactance of the transformer is given on the graph by an increase of the slope of the trapezoid, The invention seeks to overcome the mentioned drawbacks of the connection to the network of large machines and to permit improving the conditions of connection of such machines to the network.

It therefore has for its object a process for supplying electrical energy to the network with an AC generator associated with a turbine, by means of a transformer, characterized in that it consists in evaluating the generator precisely as a function of the on-site needs by lowering its nominal voltage as low as possible while continuing to satisfy the capacity of the generator to send active power delivered by the turbine and the reactive power corresponding to this active power required by a consumer or the manager of the network.

According to particular features of the invention:
lowering the voltage is carried out such that the generator can always transformer precisely the active power of the available turbine or dimension by conditions at the site and that the generator can simultaneously deliver precisely the associated reactive power, the generator is suitable for a reduced voltage Ungf so as to reduce the short circuit current and to increase the dynamic of the range of regulated voltages at least equal to that of its previous range about its previous nominal voltage Ungi;

the generator being overdimensioned and initially designed for operation under a voltage Ungi, its operating voltage Ungf with a reduced short circuit current is connected to the initial operating voltage Ungi by the relationship:

$$\frac{Ungf}{Ungi} = \frac{Sngf}{Sngi} = \sqrt{Ps^2 + Qs^2} \bigg/ \sqrt{Png^2 + Qng^2}$$

in which
$Sg = \sqrt{Ps^2 + QS^2}$

Ps and Qs being respectively the active power and the reactive power of the site, and Png and Qng being respectively the nominal active power and the nominal reactive power of the generator;

the reduction of operating voltage of an existing generator is ensured by reduction of its excitation current and adjustment of the latter as a function of the new nominal function;

the re-evaluation of the generator is ensured by reducing its dimensions (in the case of a major re-evaluation).

The invention will be better understood from a reading of the description which follows, given only by way of example and with reference to the accompanying drawings, in which.

Figure 1:
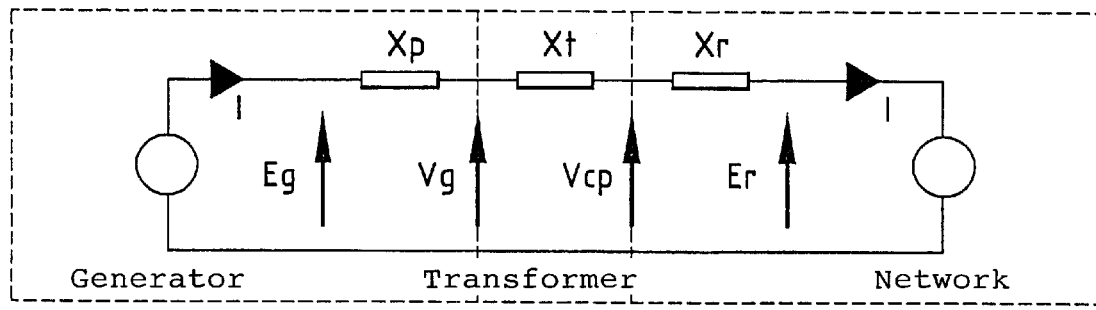
FIG. 1 is an equivalent diagram of an AC generator connected to the network.
Figure 6:
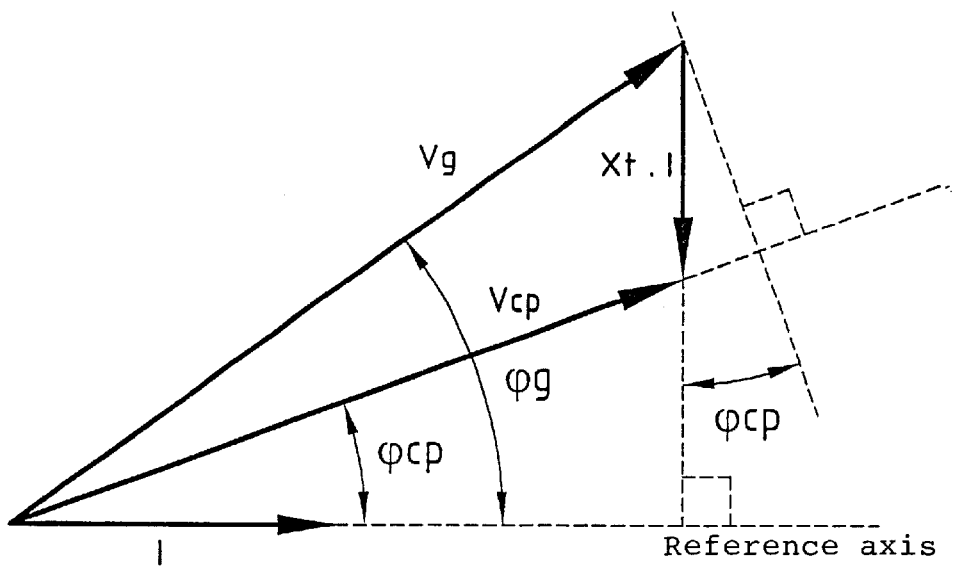
FIG. 6 is a vectorial representation of the voltage at the point of delivery and of the voltage of the generator and of their respective slopes showing a supplemental difficulty of connection of the generator to the network.

There will first be examined the operation of the diagram of FIG. 1 with Pcp and Qcp constant, developing as a function of the reactance Xt of the transformer interposed between the generator and the network (FIG. 1). This situation is given by the relationships:

$Vg \cos \psi_g = Vcp \cos \psi_{cp}$ $Vg2 \cos \psi_{g2} = Vcp \cos \psi_{cp}$

Figure 3:
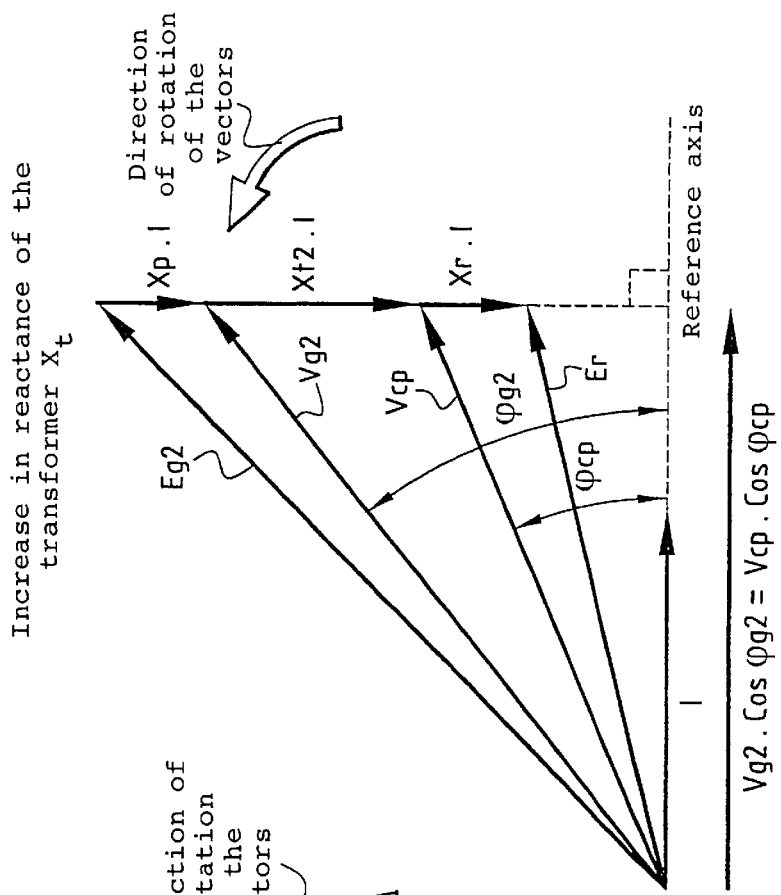
FIG. 3 is a vectorial representation of the voltage at the terminals of the network, delivered by the generator with a second value of reactance of the connection transformer.
Figure 2:
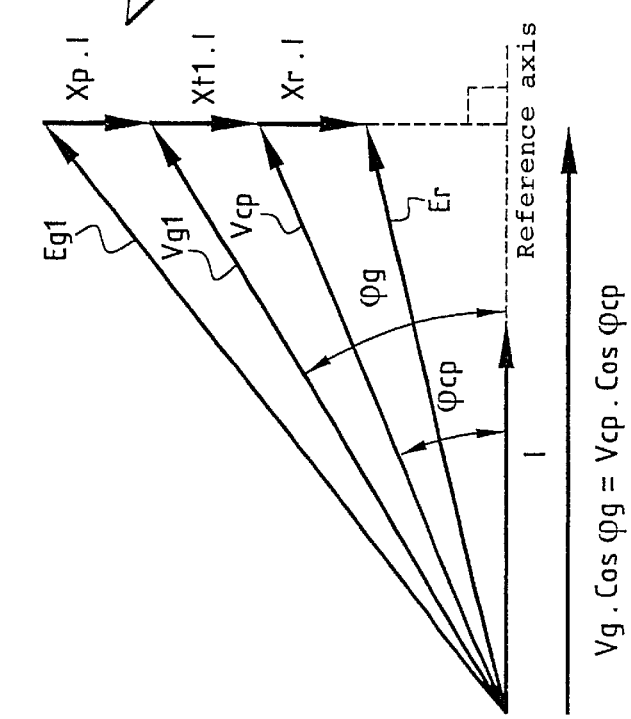
FIG. 2 is a vectorial representation of the voltage at the terminals of the network delivered by the generator with a first value of reactance of the connecting transformer.
Figure 5:
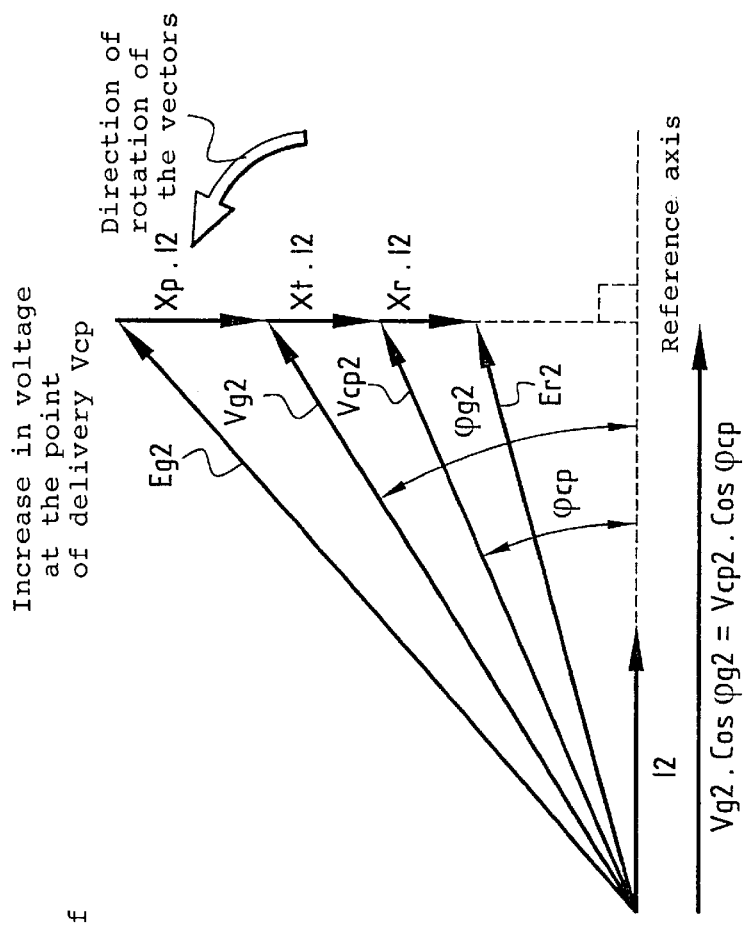
FIGS. 4 and 5 are vectorial representations of the characteristic sizes of the generator and the network with two different values of the voltage at the point of delivery.

The diagrams shown in FIGS. 2 and 3 reproduce the developments of each of the characteristic sizes when the reactance of the transformer is varied whilst keeping the active power Pcp and the reactive power Qcp delivered to the network constant, which corresponds to a general constraint imposed by the managers of the network to keep constant the ratio Qcp/Pcp.

The diagram of FIG. 1 is a vectorial representation of the different sizes taking place in the operation of the system.

The current I has for its direction the reference axis.

The voltage at the terminals of the generator having a first value Vg1 has a phase difference $\psi_{g1}$ relative to the current I.

The voltage Vcp at the point of delivery has a phase difference $\psi_{cp}$ with the current I by virtue of the presence of the reactance 1 having a first value $X_{r1}$, giving rise to a voltage drop $X_{r1} \cdot I$.

The vectorial sum of the electromotive force of the generator Eg1 and the voltage XpI due to the Potier reactance of the generator, is equal to the voltage Vg1 at the terminals of the generator.

The vectorial sum of the voltage Vcp at the terminals of the network and of the voltage Xr·I due to the direct reactance of the network, as seen as the point of delivery, is equal to the electromotive force at the point of delivery of the network.

If the reactance of the transformer increases, we have the situation shown in FIG. 2.

The voltage Vcp at the terminals of the network and the electromotive force at the point of delivery remaining unchanged, it is necessary to increase the voltage Vg2 at the terminals of the generator as well as its phase difference $\psi_{g2}$ relative to the current I and of course the electromotive force Eg2 of the generator.

Thus, to react to the increase of the reactance of the transformer and so as to keep Pcp and Qcp constant:

the alternator must be able to deliver a voltage Vg2>Vg1, the alternator must continue to supply the initial current I, the alternator must have a better power factor $\psi_{g2} > \psi_{g1}$ $\Rightarrow \cos \psi_{g2} < \cos \psi_{g1}$ Such requirements immediately imply for the alternator:
a more extreme magnetic condition leading to higher losses in the iron.

But the losses in the iron generally represent less than 15% of the total of the losses, this same total representing only about 1.5% of the nominal power of the machine.

no change of the losses by Joule effect and supplemental losses, because the current in the stator remains constant.

Thus, there is an increase of losses in the rotor because to have Eg2>Eg1, there must be a higher excitation.

The impact of increasing $\psi_g$ is taken account of by the current of the rotor. There results an increase of Eg.

It is a matter of greater excitement, which induces losses by the Joule effect in the rotor.

It will thus be seen that if there is used a standard machine:

1) it is necessary to be able to more greatly excite the machine to increase its internal electromotive force or e.m.f. Eg and hence its external voltage Vg.

The machine thus supplies the same active power but more reactive power.

This increase of reactive power is consumed in the reactance of the transformer.

2) it is necessary to have the capacity to remove a delta (difference, increase) of calories due to the increase of the losses in the iron and by the Joule effect.

The increase of the reactance of the transformer connecting the alternator to the network to reduce the short circuit current toward the network leads to having an alternator having the same active power and a higher reactive power and able to operate at a higher nominal voltage.

There will now be considered the operation at constant Pcp and Qcp and the development of this operation as a function of the voltage at the point of deliver.

Vg1 and Vg2 being two different voltages of the generator, this condition leads to the relationships:

$$Vg1 \cos \psi_{g1} = Vcp1 \cos \psi_{cp}$$

$$Vg2 \cos \psi_{g2} = Vcp2 \cos \psi_{cp}$$

Figure 4:
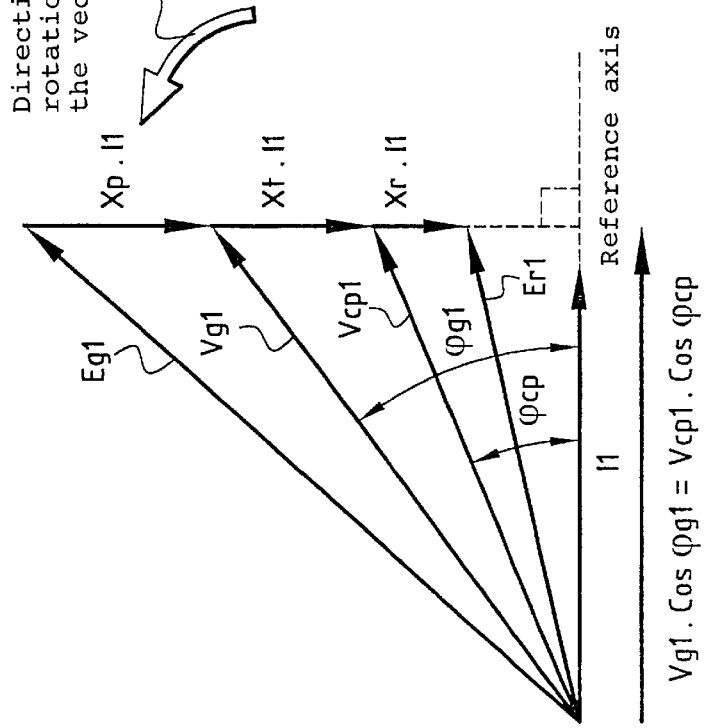

The diagrams of FIGS. 3 and 4 show the developments of each of the characteristic magnitudes when the voltage is varied at the point of connection, whilst keeping constant as in the preceding case the active power Pcp and the reactive power Qcp delivered to the network.

The developments are here less evident and cannot all be seen from the graphs.

It is necessary to return to the base equations of the balances of power (1) to (6) and to consider the developments necessary for their preservation.

The apparent power Scp being kept, at the point of delivery (Pcp, Qcp) unchanged:

the power factor at the point of delivery is unchanged and remains cos $\psi_{cp}$;

the new current I2 is derived from the previous current I1 by the equation:

$$Scp1 = Scp2 = Vcp1 \cdot I1 = Vcp I2$$

$$I2 = I1 \ (Vcp1/Vcp2)$$

The new current is lower than the former;

the reactive power consumption in the transformer becomes:

$$Qt2 = Xtl_2^2 = Xtl_1^2 (Vcp1/Vcp2)^2 = Qt1 \ (Vcp1/Vcp2)^2$$

It will be noted that in the case of voltage increase, Vcp1/Vcp2<1 and therefore Qt2<Qt1.

The alternator must therefore supply the same active power; Pcp and a total reactive power Qg2, such that:

$$Qg2 = Qcp + Qt2 = Qcp + Qt1 \ (Vcp1/Vcp2)^2$$

The power factor of the alternator derives from its new tg$\psi_{g2}$=Qg2/Pcp.

Given that Qg2<Qg1, cos $\psi_{g2}$>cos $\psi_{g1}$.

A better cos $\psi$ will therefore not be required of the alternator.

The new voltage of the alternator derives from the equation (7) established in the paragraph which relates to the slope of development of the reactive power as a function of the voltage at the point of coupling.

$$Qcp + Qg = (Vg^2 - Vcp^2)/X \rightarrow Vg^2 = Xt \cdot (Qcp + Qg) + Vcp^2 \quad (7)$$

It is established above that Qg decreases when the voltage Vcp increases. It therefore suffices that the equation $Vg^2 = Xt \cdot (Qcp+Qg) + Vcp^2$ be verified by Vcp=Vref=Uref/$3^{0.5}$ and that the alternator can raise its voltage Vg in a homothetic manner to Vcp.

To simplify, a constant Vo can be defined as:

$$Vo^2 = Xt(Qcp+Qg)_{[Vcp-Vref]} = Xt(QCP+Qg_{[Vcp-Vref]})$$

Thus $$Vg^2 = Vcp^2 + Vo^2$$

and therefore, dVg/Vg=dVcp/Vcp is the relationship sufficient that the alternator may continue to "export" at least the same quantity of reactive power seen at the point of delivery.

It will be seen clearly that to react to the increase of voltage at the delivery point and so as to keep Pcp and Qcp constant;

the alternator must be able to raise the voltage Vg at its terminals such that the relative variation dVg/Vg will be equal to the relative variation of the voltage Vcp at the point of delivery (dVcp/Vcp).

The documents expressing the conditions of connection will show a supplemental connection condition.

It results directly from the inability of the modern alternators to provide a dynamic of a voltage regulation at their terminals, greater than ±10% about their nominal voltage.

The resulting difficulty is above all seen for high reference voltages which prevent the alternator, itself incapable of raising its voltage more than 10%, to supply all the expected reactive power.

This habitual limitation of alternators leads the managing bodies of transport networks to impose, in addition to a maximum reactance of the transformer, a slope for the curve [c,u].

This slope is not mathematically equal to that of the parallelogram shown in the conventional diagrams of schedules of charges at the point of delivery, but remains in spite of everything, fairly well given by the slope of the parallelogram.

The lower this slope, the less the loss of reactive energy in the transformer will be perceptible, especially for high network voltages.

The slope is defined by the reactive power variation exchanged at the point of coupling as a function of the difference between the voltage at the point of coupling and the voltage of the alternator.

By giving the variations with the prefix "d" as "delta" or "difference":

$$Vg \cos \psi_g = Vcp \cos \psi_{cp} \quad (8)$$

$$Vg \sin \psi_g = Vcp \sin \psi_{cp} + Xt \cdot I \quad (9)$$

$$Vg \cdot I \sin \psi_g = Vcp \cdot I \sin \psi_{cp} + Xt I^2$$

$$Qg = Qcp + Qt$$

$$Qg - Qcp = Qt \quad (10)$$

$$Vg^2 = Vcp^2 + 2Vcp \cdot I \sin \psi_{cp} Xt + Xt^2 \cdot I^2$$

$$\frac{Vg^2 - Vcp^2}{Xt} = 2Vcp \cdot I \cdot \sin\varphi cp + XTI^2$$

$$\left(\frac{Vg^2 - Vcp^2}{Xt}\right) = 2Qcp + Qt = Qcp + Qg$$

$$Qg + Qcp = \left(\frac{Vg^2 - Vcp^2}{Xt}\right)$$

$$2Qcp = (Vg^2 - Vcp^2)/Xt - Qt$$

$$Qcp + Qg = (Vg^2 - Vcp^2)/Xt \quad (7)$$

$$dQcp = 2(Vg/Xt)dVg \quad (11)$$

These expressions represent the sought relationships.

They relate only to the variables directly involved in controlling the slope.

Vcp: voltage at the point of delivery, which will be considered high to be able to evaluate the absolute voltage of the alternator Vg necessary for substantial maintenance of Qcp.

Vg: absolute voltage at the terminals of the generator,

Constant Xt: reactance of the transformer,

Qcp: reactive power at the point of delivery whose variation as a function of Vg (slope) must be controlled, Qg: reactive power supplied by the alternator, Qt: reactive power consumed by the reactance of the transformer.

It is from expression (7) that the network managers initially wished to fix a maximum reactance of the transformer Xt such that Qcp maintains a sufficient value.

Fixing the slope of the above function amounts to the same thing, because the slope can be considered from the point of delivery without imposing changes of the construction of any machine in particular (alternator or transformer).

The conventional dimensioning of the "turbine/alternator" industrial groups is always carried out:
 a) on the basis of the maximum active power of the turbine reached under conditions of energetic fluid and process not always available at the site where these groups will be installed;
 b) on the basis of a nominal reactive power Qmax=0.6 Sn (and hence Pmax above=0.8 Sn), which corresponds to a power factor cos ψ=0.8 Sn;
 c) and on the basis of a nominal voltage Vng (Ung between phases) optimized by the manufacture of the alternator for questions of stator insulation, heating, etc.

The "turbine+generator" group is very often slightly overdimensioned as to its active power and substantially always overdimensioned as to the reactive power.

The voltage of the generator is set by the manufacturer and not by the network manager.

It is therefore never imposed.

It is on the basis of the implications connected:
 to the balance when the reactance of the transformer increases so as to reduce the short circuit current;
 to the balance when the voltage at the point of delivery increases (increase of the range of performances Pco, Qcp);

It is on the basis of the manner in which are established the nominal characteristics of the rotary machines (IEC34) and of the basis on which the alternators are conventionally standardized, measured and associated with the turbines, which is the basis of the present invention.

The verifications which follow are adapted to permit. the practice of the invention.

1) Nominal active power at the site of the turbine, lower than or equal to the nominal power of the alternator delivered at the terminals of the alternator, and hence multiplied by the output of the alternator.

2) Nominal reactive power at the point of delivery (Qcp) lower than the nominal reactive power of the alternator decreased by the reactive power consumption of the transformer.

The reactive power consumed by the transformer Qt and its reactance X1 are connected by the relationship Xt=ukr (Uref$^2$/Snt) in which ukr is the short circuit voltage. Qt#Sut/uk2.

The balance of the verification necessary to practice the invention is the following.

1) a generator is available which may be overdimensioned as to active power;

2) the same generator is overdimensioned as to reactive power.

The invention consists in evaluating the generator precisely as a function of the needs at the site, by lowering the nominal voltage as low as possible while continuing to satisfy the capacity to export active power delivered by the drive device of the generator, the reactive power corresponding to this active power required by the consumer or the network manager.

Lowering the voltage is ensured such that the alternator can always transform precisely the active power of the drive device available or dimensioned by the site conditions and that the alternator can simultaneously deliver precisely the associated reactive power defined by the consumer.

Although rotary machines operate over extended voltage ranges (outside the ranges defined by the existing standards, IEC 34 for rotary machines), and several generators supply variable voltages for specific applications, often temporarily, there does not exist, to the knowledge of the applicant, any industrial application for large size machines (>10 MW) in which the machine is voluntarily declassified, basically re-evaluated, and revalued with performances corresponding to a reduced voltage, so as to:
 reduce the short circuit current of the machine (subtransitory, transitory and permanent current) and this calculated by existing standards;
 increase the dynamic of the range of regulated voltages such that the alternator can continue to deliver its "new" reactive power (lower than the former) for regulated voltages at least equal to those of its former range about its former nominal voltage.

There will now be examined the evaluation of the minimum downgrading of voltage.

The method used is conservative, because as the losses of the rotor are reduced to a great proportion because they vary with the square of the excitation current and the e.m.f. required is lower, as the overall iron losses are slightly reduced by virtue of the reduced e.m.f., in the heat balance of the losses to be dissipated, there could therefore be accepted stator losses slightly greater than the original losses.

It will be noted moveover that the escape flux decreases under excitation as well as the Potier reactance of the generator, such that the losses to the rotor are greatly lessened with respect to the relatively low downgrading of nominal voltage.

The original apparent power is expressed by the relationship:

$Sngi^2 = Pngi^2 + Qngi^2$

The final apparent power is expressed by the relationship:

$Snfg^2 = Pngf^2 + Qngf^2$

So as to work to the minimum with constant stator current, it is necessary that:

$$\frac{Ungf}{Ungi} = \frac{Sngf}{Sngi}$$

At the minimum, the new voltage of the stator is derived from the former by the relationship:

$Ungf = Ungi \, [Sngf/Sngi]$

Ungi representing the original nominal voltage of the alternator.

Sngi representing the original rating of the alternator.

Sngf representing what the site actually requires of the alternator.

Of course, for optimization, the manufacturer will have the task of obtaining for the generator a new nominal voltage as low as possible.

The short circuit current evaluated by the standards such as IEC 909 in Europe, for example, gives rise to two terms in the evaluation of impedance involved in the short circuit current.

The overall impedance is according to the international standard: $Zkg = kg \,(0.05 \text{ or } 0.07+i) \, x'd$.

0.05 for machines ≧ or equal to 100MVA and 0.07 for machines of a power less than 100 MVA.

x'd = transitory reactance (originally subtransitory x"d in l'IEC 909).

kg is a corrective term of impedance, used for synchronous machines whose value is:

$kg = cmax/(1 + x'd \cdot \sin \psi_{ng})$ wherein:

cmax = coefficient imposed by the standard and modifiable by the manager of the network.

x'd = transitory reactance (originally subtransitory x"d) of the alternator.

$\sin_{\psi ng}$ is derived from the nominal power factor $\cos_{\psi ng}$ of the alternator.

cmax varies from 1 to 1.1 according to the type of short circuit current, minimum or maximum, which it is sought to establish and according to the number of uncertainties in the network which it is sought to take account of in the final result.

The new $\cos_\psi$ having been increased giving rise to a probable reduction of performance because of the reduction of the ratio Qng/Png, $\sin_{\psi ng}$ is therefore reduced.

As a result, kg increases slightly.

The other terms are unchanged, except x'd which increases slightly because of the desaturation arising from operation at a sub-excitation with lower e.m.f.

In the final result, the new short circuit current develops to the standards which follows:

Initial value $I'kgi = cmax Uni/(3^{0.5} Zkgi)$

Final value $I'kgf = cmax Unf/(3^{0.5} Zkgf)$

When Unf<Uni and probably Zkgi<Zkgf, it will be seen that therefore the short circuit of the terminals of the alternator is reduced by a ratio at least equal to the ratio of the initial and final nominal voltages.

Red $Icc < Ungf/Ungi$

There is moreover obtained an increase of the dynamic of voltage regulation toward high voltages.

At the outset, for modern machines, the dynamic of regulation is given generally by the relationship: Umaxi=1.1 Ungi With the new nominal voltage: Ungf=k Ungi wherein k<1, Umaxi remains unchanged in absolute value and equals: Umaxi=(1.1/k)Ugnf The dynamic increase, toward maximum voltages, is therefore within the ratio i/k. AugDyn=Ungi/Ungf.

What is claimed is:

1. Process for supplying electrical energy to the network with an AC generator associated with a turbine, by means of a transformer, characterized in that it consists in evaluating the generator precisely as a function of the needs of the site by lowering its nominal voltage as much as possible while continuing to satisfy the capacity of the generator to export active power delivered by the turbine and the reactive power corresponding to this active power required by a consumer or the network manager.

2. Process according to claim 1, characterized in that lowering the voltage is effected such that the generator can always transform precisely the active power of the turbine available or dimensioned by conditions at the site and that the generator can simultaneously deliver precisely the associated reactive power.

3. Process according to claim 1, characterized in that the generator is adapted to a reduced voltage (Ungf) so as to reduce the short circuit current and increase the dynamic of the range of regulated voltages at least equal to that of its previous range about its previous nominal voltage (Ungi).

4. Process according to claim 1, characterized in that the generator being overdimensioned and initially designed for operation under a voltage (Ungi), its operating voltage (Ungf) with a reduced short circuit current is connected to the initial operating voltage (Ungi) by the relationship:

$$\frac{Ungf}{Ungi} = \frac{Sngf}{Sngi} = \sqrt{Ps^2 + Qs^2} \Big/ \sqrt{Png^2 + Qng^2}$$

in which $Sg = \sqrt{Ps^2 + Qs^2}$

Ps and Qs being respectively the active power and the reactive power of the site, and Png and Qng being respectively the nominal active power and the nominal reactive power of the generator.

5. Process according to claim 1, characterized in that the reduction of the operating voltage of an existing generator is ensured by reduction of its excitation current and adjustment of the latter as a function of the new nominal function.

6. Process according to claim 4, characterized in that the re-evaluation of the generator is ensured by reducing its dimensions.

* * * * *